United States Patent
Stevenson et al.

(10) Patent No.: US 6,393,161 B1
(45) Date of Patent: May 21, 2002

(54) SOFTWARE SYSTEM FOR MINIMIZING IMAGE DEFECTS IN A HARD-COPY INPUT SCANNER

(75) Inventors: Duncan I. Stevenson, St. Albans; Ian A. Parks, Herts, both of (GB)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/299,396

(22) Filed: Apr. 26, 1999

(51) Int. Cl.[7] .............................. G06T 5/00; G06K 9/40; H04N 1/407
(52) U.S. Cl. ...................... 382/275; 382/274; 358/463; 358/461
(58) Field of Search ................................ 382/275, 274, 382/254, 260, 205; 358/461, 463, 471, 482, 483, 474

(56) References Cited

U.S. PATENT DOCUMENTS

| | | | |
|---|---|---|---|
| 4,389,677 A | * 6/1983 | Rushby et al. ............... 358/461 |
| 5,214,470 A | 5/1993 | Denber ......................... 355/75 |
| 5,339,139 A | 8/1994 | Fullerton et al. ........... 399/203 |
| 5,467,410 A | 11/1995 | Bloomberg ................. 382/100 |
| 5,500,745 A | * 3/1996 | Iishiba et al. ................ 358/461 |
| 5,644,409 A | 7/1997 | Irie et al. ..................... 358/461 |
| 5,881,182 A | * 3/1999 | Fiete et al. .................. 382/275 |
| 5,987,347 A | * 11/1999 | Khoury et al. .............. 382/131 |
| 6,335,982 B1 | * 1/2002 | Arai et al. ................... 356/600 |

* cited by examiner

*Primary Examiner*—Scott Rogers
(74) *Attorney, Agent, or Firm*—R. Hutter

(57) ABSTRACT

In a document handler associated with an input scanner, such as for a digital copier or facsimile machine, an image-bearing sheet is moved over a relatively narrow window, through which the image is recorded by a photosensitive chip. When a spot of dirt attaches to the window, a streak results in the image data. This streaking problem is addressed by detecting image data consistent with such a streak, and applying a suitable correction algorithm to the image data. The suitable algorithm is chosen based on the thickness of the streak and the nature of the image data.

8 Claims, 4 Drawing Sheets

SOFTWARE SYSTEM FOR MINIMIZING IMAGE DEFECTS IN A HARD-COPY INPUT SCANNER

FIELD OF THE INVENTION

The present invention relates to input scanners as would be found, for example, in digital copiers, facsimile machines, and the like.

BACKGROUND OF THE INVENTION

Certain types of familiar office equipment, such as copiers, or facsimile machines, accept images from hard-copy sources for recording and reproduction. Very often these original images originate on sheets of paper which are fed through an automatic "document handler" which takes a stack of sheets and feeds them serially over a platen or other window, where the images are recorded. In a digital copier, facsimile machine, or scanner, the window is associated with one or more photosensitive semiconductor chips which convert the light reflected from the series of small areas on each sheet into video signals which are then digitized and converted to digital image data, which can then be retained in a memory. In the case of the standard "light lens" or "analog" copier, the light reflected from the series of sheets fed through the scanner is directed to a photoreceptor, as is well known in the art.

In one particular type of document handler, a type which is particularly useful for digital applications such as a digital copier or facsimile, the platen or window over which sheets are successively passed is essentially a narrow slit, through which only a relatively thin line of each sheet is "viewed" at a time, such as by the photosensitive semiconductor chip. In such a design, each sheet being fed through the document handler is passed at a known velocity over the window or platen while the photosensitive semiconductor chip records and outputs data over time. In other words, in such an arrangement, the photosensitive chip is exposed a series of very thin views of the sheet over time, and then circuitry associated with the chip in effect reassembles a large number of such slits to accumulate data descriptive of the entire image on the sheet. One example of a design of a document handler of this configuration is given in U.S. Pat. No. 5,339,139. Such a document handler which moves sheets: at a constant velocity over a narrow platen or window is known as a "constant velocity transport" or CVT.

One practical problem which has been noticed in applications of a CVT, particularly in regard to digital copiers and facsimile machines, is the fact that a small quantity of dirt which may attach to the small window or platen over which each sheet passes can cause a significant image defect in resulting digital images. Because a spot of dirt is stationary on the window, the image of the dirt on the window is repeatedly scanned by the photosensitive chip even as successive areas of one sheet move over the window. When a printout is made of the image thus recorded with the CVT, the print will have a straight streak on it corresponding to the position of the original spot of dirt.

The present invention is directed toward a technique for minimizing or eliminating the effect of small quantities of dirt on the window of a CVT in a hard copy scanner.

DESCRIPTION OF THE PRIOR ART

In the prior art, U.S. Pat. No. 5,214,470 discloses a method and apparatus for detecting the presence of dirt or abrasions on a document platen and preventing these defects from being reproduced as unwanted spots on output copies. The platen is first scanned without a document placed thereon and an electronic image is generated and stored which contains information on the location of a dirt spot or inherent defect such as etched marks on the platen. Upon the initiation of a scanning mode with a document placed on the platen, the scanned electronic document image is subjected to a logical XOR process to correlate the previously stored spot location with the same location on the document image. Once the spot location is determined, the spot is erased within the digital image data. Significantly, this patent does not disclose the special problems of dirt appearing on the window of a CVT or other automatic document handler.

U.S. Pat. No. 5,339,139 is cited as an example of a document feeding system, otherwise known as a constant velocity transport or document handler, as would be found, for instance, in a currently-available digital copier.

U.S. Pat. No. 5,467,410 discloses a software technique for quickly determining whether a binary input image originated as a blank page, submission of blank pages being a possible occurrence when accepting data from a device having an automatic document handler. The disclosure recognizes that a page image may contain vertical streaks that are not part of the original paper document. A threshold analysis typically allows a certain number of such streaks to be present without concluding that the page is not blank.

U.S. Pat. No. 5,644,409 discloses a system used in conjunction with a document handler. In particular, the patent discloses a system for compensating for dirt accumulating within the document handler, such dirt affecting the white reference value when the apparatus is calibrated.

SUMMARY OF THE INVENTION

According to the present invention, there is provided a method of operating a document handler for causing an image-bearing sheet to pass over a light-transmissive window in a process direction for recording by a photosensitive member, the photosensitive member being exposed to a portion of the image-bearing sheet through a scan line which is narrower than the window along the process direction. In image data output by the photosensor array, image data consistent with one photosensor in the array repeatedly outputting a black pixel over a predetermined number of output lines is detected. The image data consistent with one photosensor in the array repeatedly outputting a black pixel over a predetermined number of output lines is identified as a subset of streak pixels within a set of image data forming an image. An image-correction algorithm is applied to a subset of neighboring pixels within the image data, the neighboring pixels having a predetermined spatial relationship to a streak pixel within the image data. The streak pixels in the image data are selectably altered based on the algorithm applied to the neighboring pixels.

DETAILED DESCRIPTION OF THE INVENTION

Figure 1:
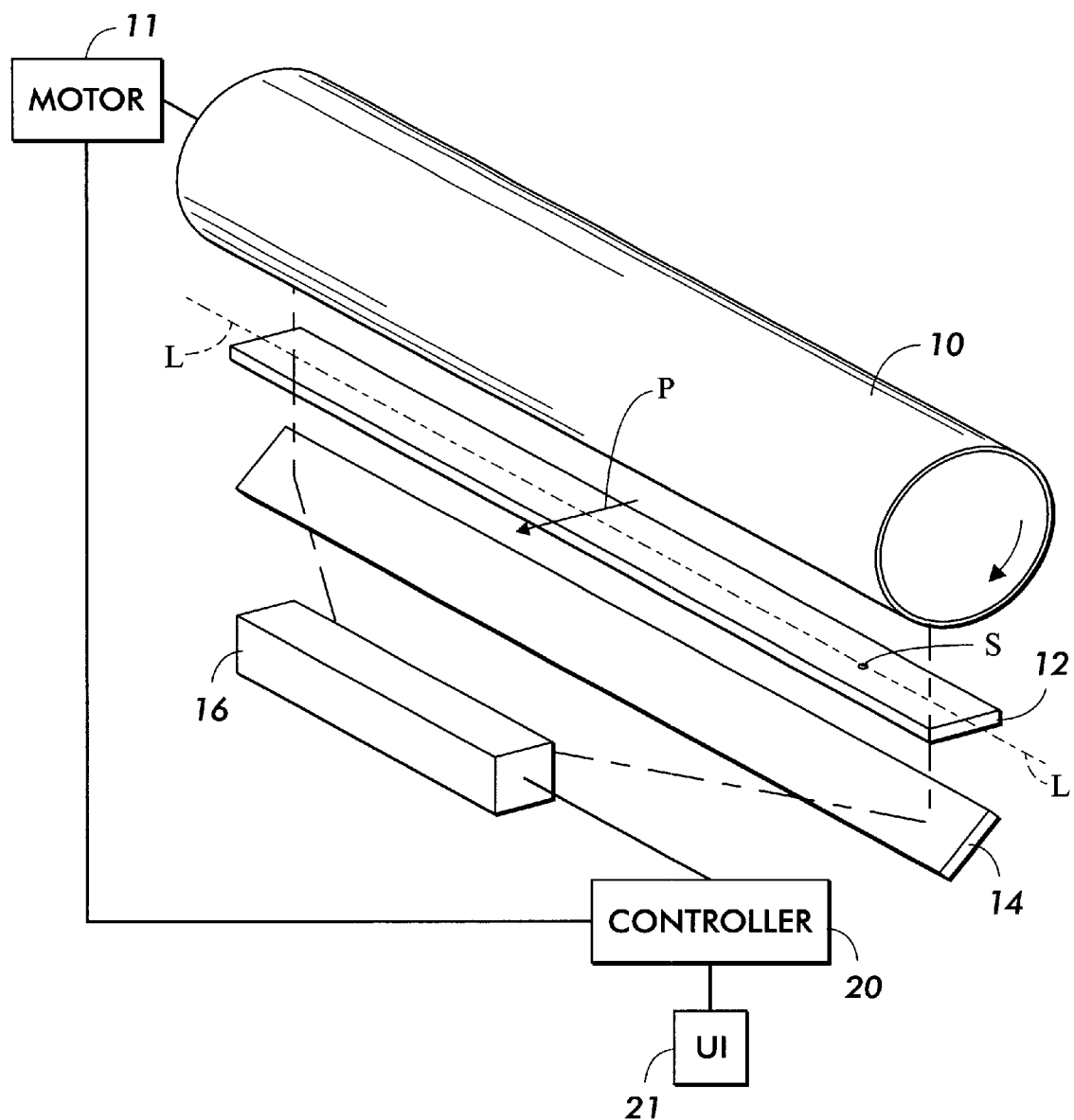
FIG. 1 is a simplified, partially schematic diagram showing the essential portions of a document handler or constant-velocity transport as used with the present invention.

FIG. 1 is a simplified view showing some essential hardware elements of a constant velocity transport (CVT) as used in a document handler as would be found, for example, in a digital copier. Although only the most essential elements of such hardware are shown in the figure, a more detailed implementation of a document handler as used in a digital copier may be seen for example in U.S. Pat. No. 5,339,139, issued to the assignee hereof. With particular reference to the figure, a roller 10 rotating in the indicated direction and moved ultimately by a motor 11 drives a sheet of paper (not shown) thereon in a process direction P over what is here called a "window" 12. In a practical embodiment of the hardware, it is likely that roller 10 will be placed in very close proximity to the top surface of window 12, the roller 10 and surface of window 12, thus forming a relatively narrow nip for the passage of a single sheet of paper therethrough.

The window 12 is light-transmissive, and light from a light source (not shown) reflected from a sheet riding on roller 10 would pass through window 12 and, in this particular embodiment, be reflected onto a mirror 14. The light reflected from mirror 14 would then be directed to a photosensitive semiconductor chip such as shown as 16. Depending on the size of photosensitive chip 16, there may be included any amount of reductive optics (not shown). In an alternate embodiment of the present invention, instead of a relatively short single photosensitive chip 16, there could be provided a "full width array" of photosensors, meaning an arrangement of photosensors which extend the full width of roller 10 so that reductive optics, or even the mirror 14, are not required.

When a sheet riding on the outer surface of roller 10 is caused to move in process direction P over the window 12, the photosensitive chip 16 is exposed, through window 12 and mirror 14 to a series of "slits" representing individual window-wide rows of pixels from the original image riding on roller 10. Photosensitive chip 16 typically defines a single linear array of photosensors, each photosensor in the array "seeing" one pixel in this slit at a time. As is well known, as a succession of slits forming an entire image is viewed by photosensitive chip 16, the data resulting from the series of slits can be reassembled, by downstream circuitry such as indicated as control 20, to synthesize data representative of the entire page image. The "scan line" indicated as L—L shown in FIG. 1 is a line, having a small but finite thickness along process direction P, through which the linear array of photosensors of photosensitive chip 16 actually "see" through window 12.

A practical problem which has been noted with document handlers of the general design shown in FIG. 1 occurs when a spot of dirt or other debris (or, alternately, an abrasion which has been created on window 12), is attached to either the top or bottom surface of window 12. If a spot such as S on a surface of window 12 remains stationary even as a sheet is passed over window 12 by roller 10, the spot S will be repeatedly recorded.

The present invention minimizes or overcomes the streaking problem caused by a spot attaching to window 12 by detecting conditions wherein a spot on window 12 may cause streaking in resulting digital data, and then corrects the resulting digital data to minimize or remove the streak.

As a first part of the method, a streak in the resulting image data which could be consistent with a spot of dirt on window 12 must be identified. This dirt on window 12 could be first detected by direct monitoring of a video output from photosensitive chip 16. Monitoring tell-tale "streak" data directly as video data is being output from photosensitive chip 16 has the advantage of triggering subsequent image-correction steps on individual page image data only as necessary, although it may well be convenient, in some systems to provide the streak-removal steps described below to image data which has been digitized and preserved in a file.

If there is a spot of dirt at a particular location along the scan line L of window 12, this streak will manifest itself as a certain photosensor of the linear array of photosensors on photosensitive chip 16 always outputting black (or some equivalent set of colors if it is a color photosensitive chip) in a relatively long series of lines of video output from photosensitive chip 16. Depending on a particular implementation, it may be desirable to require that the particular pixel be black for the entire time a particular page image is scanned, or merely that a particular photosensor has been outputting black for a threshold number of video output lines during the scanning process. If it is thus determined that the output of a particular photosensor (pixel) is "always black" for purposes of the present invention, the image-correction method of the present invention can then be triggered. This image-correction method is preferably applied to the digitized image data which is assembled based on the original video data from photosensitive chip 16.

In the digital data resulting from a scan in which conditions likely for a streak are determined, the streak should be readily detectable in the position in the digital data where black pixels are repeatedly detected. Such a streak, in a copy or facsimile resulting from the scanned image data, will be a conspicuous image defect. The question is how to remedy this defect in the image data. One simple solution is, when such a streak is detected, to simply change the black pixels in the streak to white: this would have the advantage of simplicity and at least a white streak is less conspicuous than a black streak, such as on a page of text. In a preferred embodiment of the present invention, whether to change a pixel in the image data corresponding to a streak to black or white could be determined by any number of polls of neighboring pixel data. In brief, if a certain number of neighboring pixels to a streak pixel are black, chances are the pixel along the streak should have been black anyway. If a certain number of pixels around a streak pixel are white, then chances are the pixel in the streak should be changed from black to white.

Figure 2:
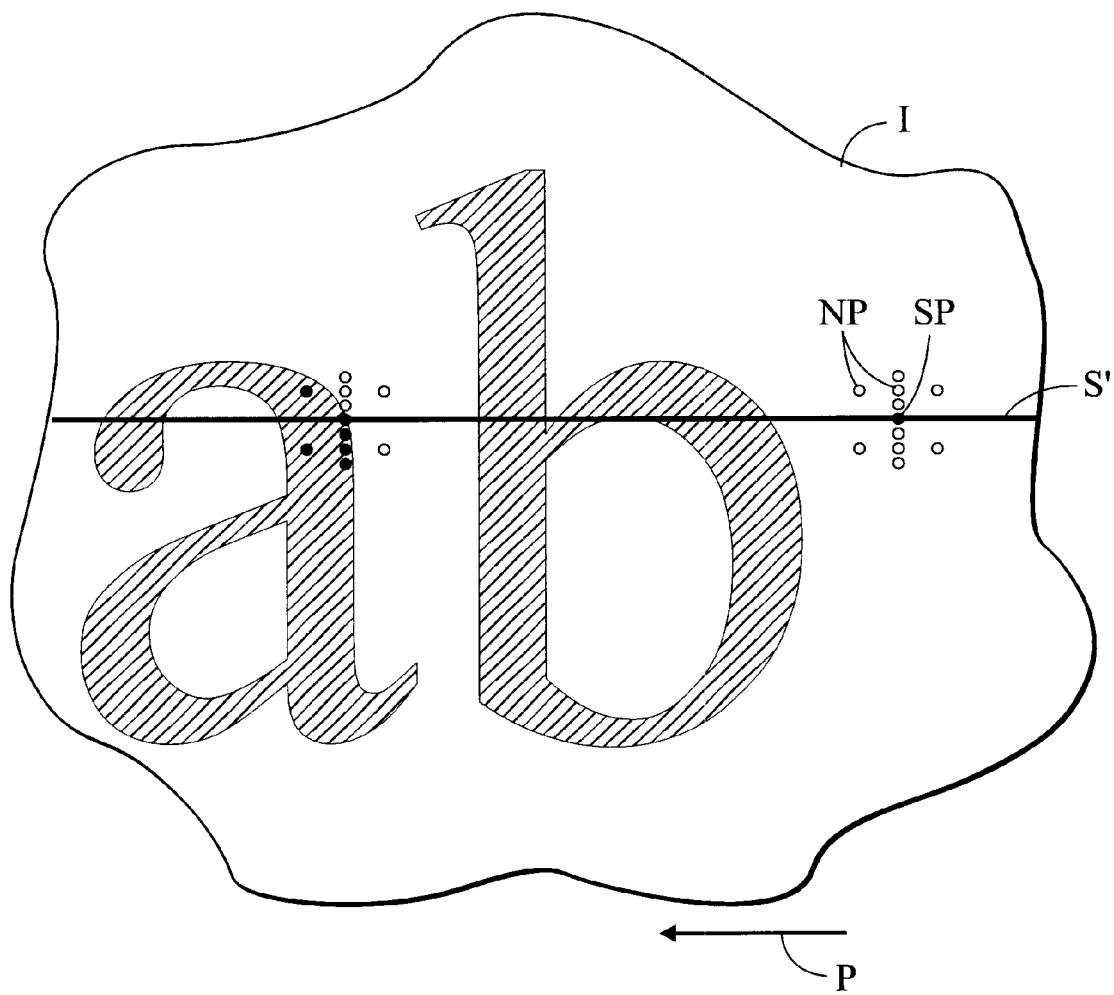
FIG. 2 is an example of streak data as would be found in an image created with image data derived from a document handler as shown in FIG. 1.

FIG. 2 is an example of a small portion of image data exhibiting a streak as would be caused by a spot of dirt on window 12. What is shown in FIG. 2 is a portion of an image I having two alphanumeric characters therein. The streak S' is related to a spot of dirt S on window 12 as the sheet bearing the original image data moves through process direction P as shown. As can be seen, the streak S' is essentially made of a line of black pixels, two of which are highlighted in FIG. 2. The circles (some darkened, some open) around each of the black pixels along streak S' represent a possible subset of "neighboring pixels," indicated as NP, of a predetermined spatial relationship to the particular pixel along the streak (the "streak pixel," in the language of the claims below, indicated in the Figure as SP), that could be polled within the neighboring pixels to determine whether the streak pixel should be altered (i.e., in this example, converted to white) in the original image data. The question of how many neighboring pixels NP must be of a certain color in order to change the central streak pixel SP to a different color is a matter of providing a polling algorithm.

Possible examples of such polling algorithms include having the streak pixel SP altered to match a majority of sampled neighboring pixels NP, weighting the "votes" of neighboring pixels depending on their relative position to the pixel in the streak (e.g. to give the pixels below or to the left of the pixel in question more weight than pixels above or to the right of the pixel in question), or weighting the votes of closer neighboring pixels more than farther neighboring pixels. (For purposes of the claims herein, such "weighting" of neighboring pixels can include giving a certain neighboring pixel a zero weighting under certain conditions.)

Another type of algorithm may require agreement, or matching, among multiple neighboring pixels to determine the corrected pixel in the streak area, e.g. change the streak pixel to white only if the pixel immediately above and immediately below are both white, otherwise leave black. This type of algorithm may be used in conjunction with other algorithms, or the fact that certain neighboring pixels match each other may in itself by weighted as a factor in the overall algorithm. Also, in the color context, a "match" of neighboring pixels may be determined as two pixels having colors which are sufficiently close in color space.

Different image-correction algorithms may be applied in a single scanning system depending on the thickness of the detected streak. For example, one set of neighboring pixels (such as immediate neighbors) around a streak pixel may be polled in situations where the streak is only one pixel wide. However, if the spot S on window 12 is particularly large, such as large enough to cause a streak in the image data two or three pixels wide, it may be desirable to adapt the polling and weighting algorithms and/or selection of sets of neighboring pixels and/or check of which neighboring pixels match, depending on the width of the streak, with different overall algorithms being applied depending on whether the streak is one pixel wide, two pixels wide, etc. Of course, if the streak is detected over a certain width, such as five pixels, which is not likely to be satisfactorily corrected by software, it may be desirable to have the scanner simply stop, and display an error message to the user or key operator.

The system of the present invention can be utilized in a monochrome or color-scanning context. As color documents, particularly photographs, are highly random on a pixel by pixel basis, in contrast to black and white documents which are typically text, it is probably most advisable to alter a pixel along a streak S to the colors of pixels very closely adjacent thereto so that the corrected pixels along the streak are minimally conspicuous. It is also possible to provide different polling algorithms for a single scanning system depending on whether the particular input image (or portion of an image) is detected as monochrome or color.

Figure 3:
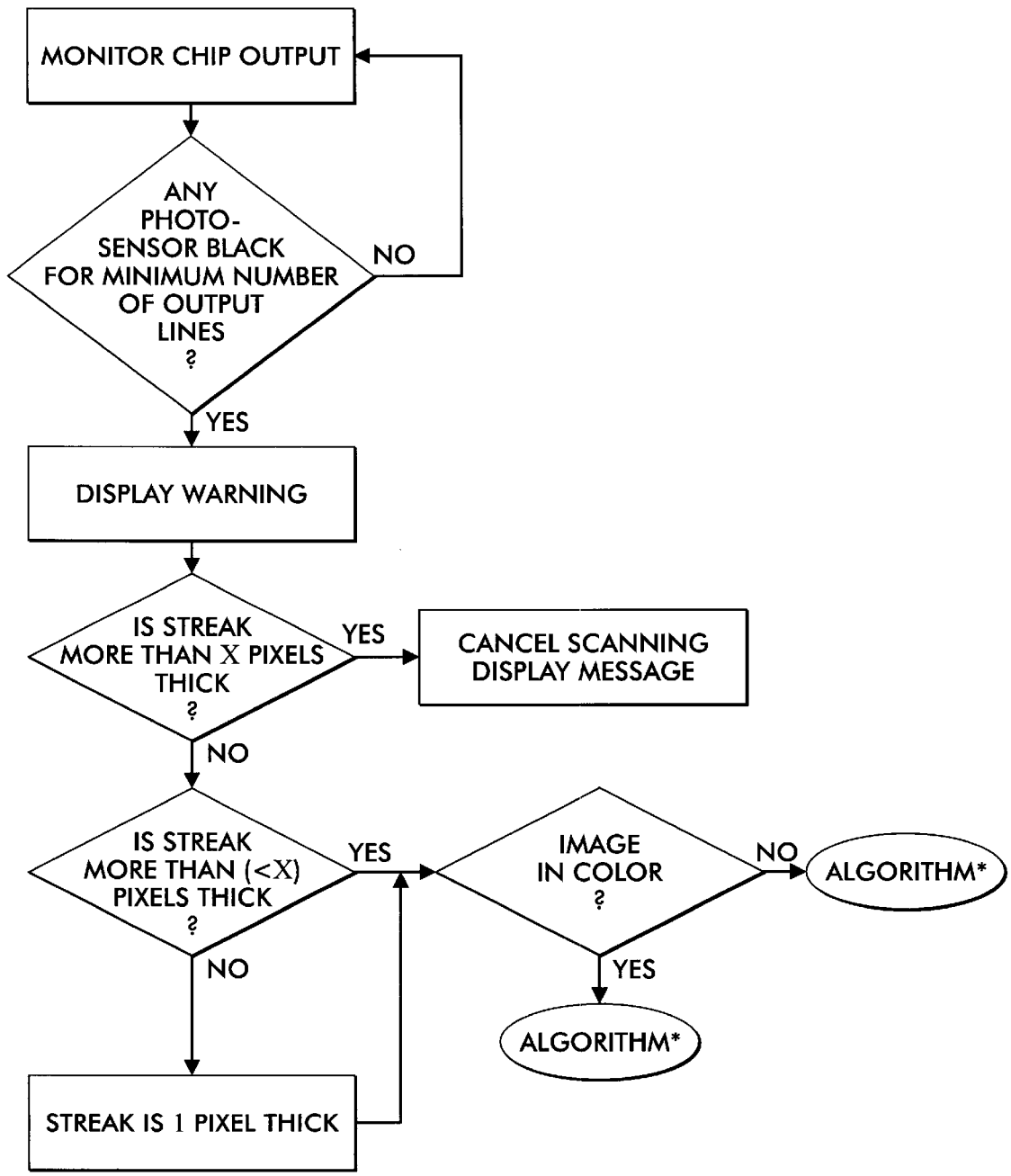
FIGS. 3 and 4 are flowcharts showing a method of correcting streak data according to the present invention.
Figure 4:
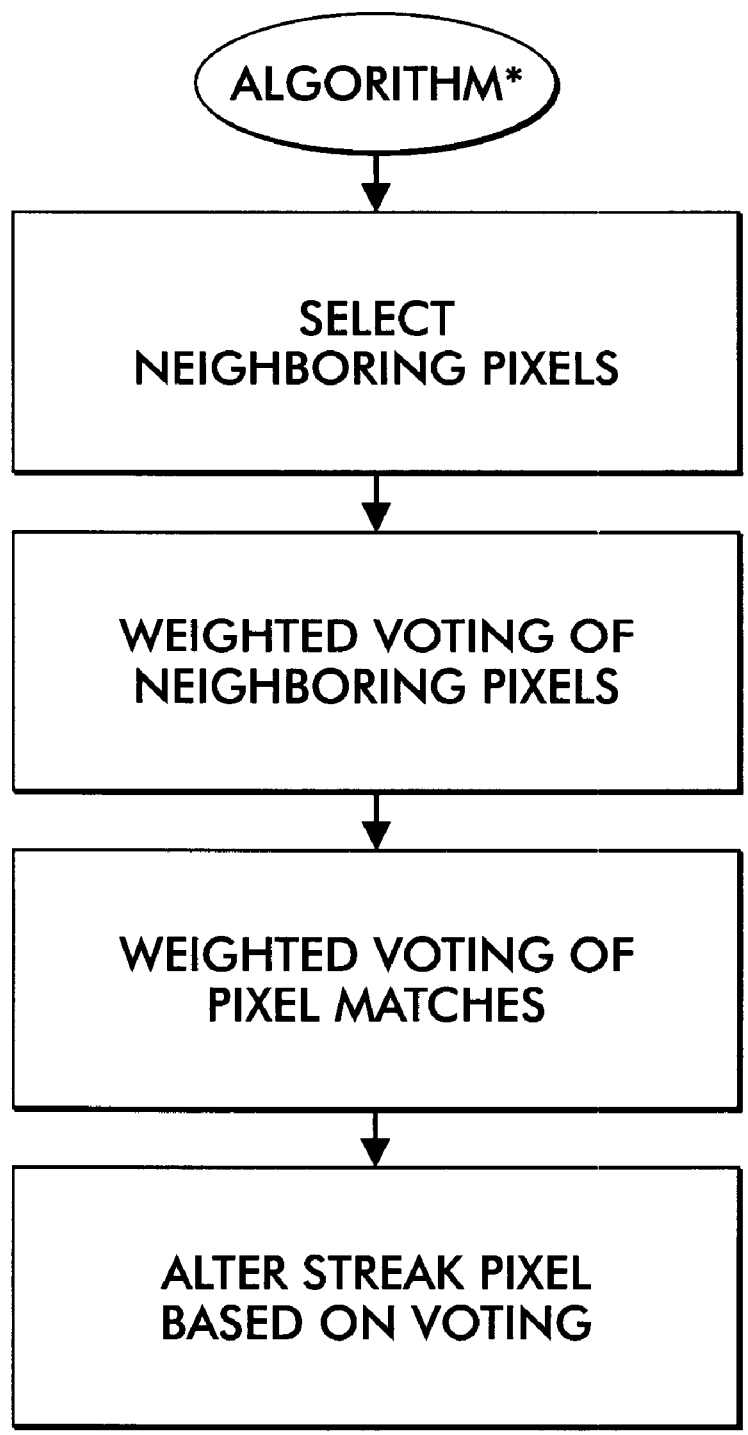

The flowcharts of FIGS. 3 and 4 summarize how a method of correcting detected streak pixels can be applied to data output from a photosensor chip 16 and retained as a file of digital data, such as in control means 20. FIG. 3 shows how streak data, once detected, can be directed to a most suitable algorithm depending on, for instance, the width of the streak (although if the streak is too wide, the scanning operation is cancelled), and whether the data being scanned is color or monochrome. In any case, the method leads to one or another correction algorithm, each algorithm being generalized by the steps shown in the flowchart of FIG. 4: as shown, for each algorithm, suitable neighboring pixels are selected, the neighboring pixels are polled (perhaps according to a weighted voting system), and matches of certain neighboring pixels are taken into account. The streak pixel in question is thus altered (such as changed from black to white, or from black to a color determined by the colors of the neighboring pixels) based on the algorithm. Once again, the specific details of the algorithm in FIG. 4 may be selected as being appropriate to the classification of the streak data as performed by the steps of FIG. 3.

An important practical feature which is useful with the present invention is to give a user an option of selectably disabling the streak-detection software. Certain sets of original documents being scanned, such as spreadsheets, may intentionally have long horizontal or vertical lines, and in some situations the presence of such lines may be interpreted by the control system as resulting from a spot on window 12.

In overview, the present invention addresses the image defect of streaking caused by dirt on the window of a CVT by first detecting a characteristic streak condition in the data output by the scanner when a sheet is fed therethrough; and then, when a streak condition is detected, applying an image-correction algorithm to the pixels in the image data associated with the streak.

What is claimed is:

1. In a document handler for causing, an image-bearing sheet to pass over a light-transmissive window in a process direction for recording by a photosensor array, the photosensor array being exposed to a portion of the image-bearing sheet through a window, a method comprising the steps of:

detecting, in image data output by the photosensor array, image data consistent with one photosensor in the array repeatedly outputting a black pixel over a predetermined number of output lines;

identifying the image data consistent with one photosensor in the array repeatedly outputting a black pixel over a predetermined number of output lines as a subset of streak pixels within a set of image data forming an image;

applying an image-correction algorithm to a subset of neighboring pixels within the image data, the neighboring pixels having a predetermined spatial relationship to a streak pixel within the image data;

selectably altering the streak pixels in the image data based on the algorithm applied to the neighboring pixels.

2. The method of claim 1, the step of providing the image-correction algorithm including polling the neighboring pixels.

3. The method of claim 2, the step of polling the neighboring pixels including assigning weights to different ones of the neighboring pixels.

4. The method of claim 1, the step of providing the image-correction algorithm including determining whether a first neighboring pixel matches a second neighboring pixel.

5. The method of claim 1, further comprising the steps of determining a width of the streak formed by the streak pixels within the image data;

applying a first image correction algorithm if the streak is of a first width; and applying a second image correction algorithm if the streak is of a second width.

6. The method of claim 5, wherein the neighboring pixels are of a first spatial relationship with a streak pixel in the first image correction algorithm and the neighboring pixels are of a second spatial relationship with a streak pixel in the second image correction algorithm.

7. The method of claim 1, further comprising the steps of applying a first image correction algorithm if the image data is monochrome; and applying a second image correction algorithm if the image data is in color.

8. The method of claim 7, wherein the neighboring pixels are of a first spatial relationship with a streak pixel in the first image correction algorithm and the neighboring pixels are of a second spatial relationship with a streak pixel in the second image correction algorithm.

* * * * *